US010486523B2

(12) United States Patent
Janson

(10) Patent No.: US 10,486,523 B2
(45) Date of Patent: Nov. 26, 2019

(54) HYBRID TRANSMISSION WITH VARIATOR

(71) Applicant: Ford Global Technologies, LLC, Dearborn, MI (US)

(72) Inventor: David Allen Janson, Plymouth, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 110 days.

(21) Appl. No.: 15/895,257

(22) Filed: Feb. 13, 2018

(65) Prior Publication Data

US 2019/0248223 A1    Aug. 15, 2019

(51) Int. Cl.
| | |
|---|---|
| *B60K 6/54* | (2007.10) |
| *B60K 6/543* | (2007.10) |
| *F16H 37/08* | (2006.01) |
| *F16H 3/54* | (2006.01) |
| *F16H 15/50* | (2006.01) |
| *B60K 6/365* | (2007.10) |
| *B60K 6/445* | (2007.10) |

(52) U.S. Cl.
CPC .............. *B60K 6/543* (2013.01); *B60K 6/365* (2013.01); *B60K 6/445* (2013.01); *F16H 3/54* (2013.01); *F16H 15/503* (2013.01); *F16H 37/084* (2013.01); *B60Y 2200/92* (2013.01); *F16H 2037/0873* (2013.01); *F16H 2200/2005* (2013.01); *F16H 2200/2033* (2013.01); *Y10S 903/91* (2013.01); *Y10S 903/918* (2013.01)

(58) Field of Classification Search
USPC .......................................................... 475/5
See application file for complete search history.

(56) References Cited

U.S. PATENT DOCUMENTS

| | | |
|---|---|---|
| 6,461,268 B1 | 10/2002 | Milner |
| 6,964,627 B2 | 11/2005 | Ai et al. |
| 7,070,530 B2 | 7/2006 | Ai et al. |
| 7,125,359 B2 | 10/2006 | Milner et al. |
| 7,608,006 B2 | 10/2009 | Milner |
| 8,277,350 B2 | 10/2012 | Ai et al. |
| 8,740,743 B2 | 6/2014 | Kliewer |
| 2013/0123065 A1 | 5/2013 | Bujold |

FOREIGN PATENT DOCUMENTS

| | | | | |
|---|---|---|---|---|
| DE | 102017103396 A1 | * | 10/2017 | ............. B60K 6/485 |
| EP | 2554447 A1 | * | 2/2013 | ............. B60K 6/365 |
| JP | 4263219 B2 | * | 5/2009 | ............. B60K 6/365 |

* cited by examiner

*Primary Examiner* — Dirk Wright
(74) *Attorney, Agent, or Firm* — David B. Kelley; Brooks Kushman P.C.

(57) ABSTRACT

A variator and a powersplit hybrid are connected in series. The variator is preferably a Milner epicyclic variator which has a ratio range well suited to this application. The variator permits the powersplit to operate at an optimized speed ratio. The variator further permits improved energy capture during regenerative braking. In some embodiments, clutches alternately connect the variator in series with powersplit and bypass the variator.

19 Claims, 4 Drawing Sheets

HYBRID TRANSMISSION WITH VARIATOR

TECHNICAL FIELD

This disclosure related to the field of hybrid electric vehicles. More particularly, the disclosure relates to a hybrid transmission arrangement having a powersplit section in series with a variator section.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

In order to reduce fuel consumption, some vehicles include hybrid powertrains which utilize energy storage to supplement the power produced by the internal combustion engine. These powertrains permit the vehicle to operate a portion of the time with the engine off and the remainder of the time at torque levels at which the engine is more efficient. Hybrid powertrains also enable the capture and later use of energy that would otherwise be dissipated by the braking system.

SUMMARY

A hybrid transmission includes a planetary gearset and a variator. A first planetary element, such as a carrier, is fixedly coupled to an input shaft. A second planetary element, such as a sun gear, is fixedly coupled to a first electric machine. A third planetary element, such as a ring gear, is fixedly coupled to a second electric machine and to an intermediate shaft. The variator is configured to continuously adjust a speed ratio and a torque ratio between the intermediate shaft and an output shaft. The variator may include an epicyclic ball variator, such as a Milner variator, having an input element coupled to the intermediate shaft and an output element fixedly coupled to the output shaft. In some embodiments, the input element is fixedly coupled to the intermediate shaft. In other embodiments, the input element is selectively coupled to the intermediate shaft by a first clutch. A second clutch may selectively couple the intermediate shaft to the output shaft. A brake may selectively hold the second planetary element against rotation.

DETAILED DESCRIPTION

Figure 1:
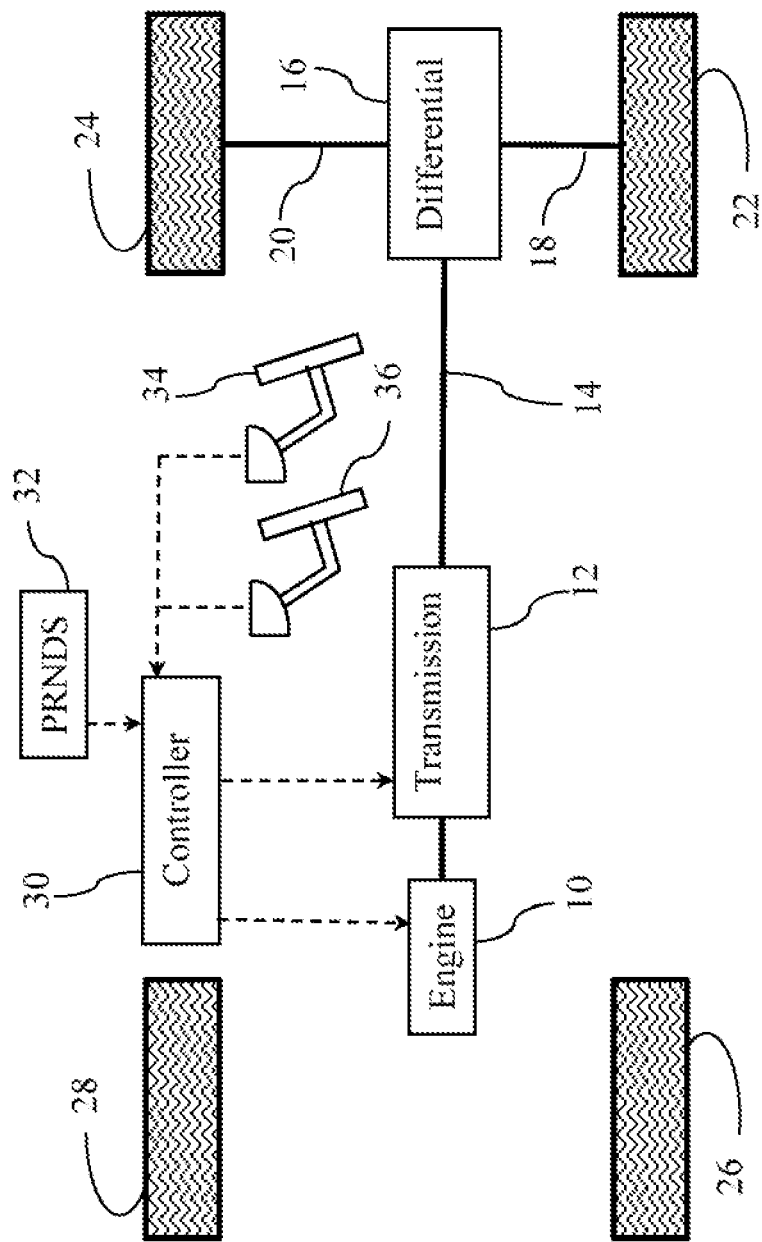
FIG. 1 is a schematic diagram of a vehicle powertrain.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A group of rotatable elements are fixedly coupled to one another if they are constrained to rotate at the same speed about the same axis in all operating conditions. Rotatable elements can be fixedly coupled by, for example, spline connections, welding, press fitting, or machining from a common solid. Slight variations in rotational displacement between fixedly coupled elements can occur such as displacement due to lash or shaft compliance. In contrast, two rotatable elements are selectively coupled by a shift element when the shift element constrains them to rotate at the same speed about the same axis whenever it is fully engaged and the rotatable elements are free to differ in speed in at least some other operating condition. A shift element that holds a rotatable element against rotation by selectively connecting it to the housing is called a brake. A shift element that selectively couples two or more rotatable elements to one another is called a clutch. Shift elements may be actively controlled devices such as hydraulically or electrically actuated clutches or brakes or may be passive devices such as one-way clutches or brakes. Two rotatable elements are coupled if they are either fixedly coupled or selectively coupled.

Some speed relationships, called fixed speed relationships, are imposed regardless of the state of any shift elements. Other speed relationships, called selective speed relationships, are imposed only when particular shift elements are fully engaged. The speed of an element is positive when the shaft rotates in one direction, negative when the shaft rotates in the opposite direction, and zero when the shaft is stationary. A proportional speed relationship exists between a first shaft and a second shaft when the ratio of their speeds is constrained to be a predetermined value. A proportional speed relationship between a first shaft and a second shaft is an underdrive relationship if the ratio of the second shaft speed to the first shaft speed is between zero and one. Similarly, a proportional speed relationship between a first shaft and a second shaft is an overdrive relationship if the ratio of the second shaft speed to the first shaft speed is greater than one. A linear speed relationship exists among an ordered list of shafts when i) the first and last shaft in the ordered list are constrained to have the most extreme speeds, ii) the speeds of the remaining shafts are each constrained to be a weighted average of the speeds of the first and last shafts, and iii) when the speeds of the shafts differ, they are constrained to be in the listed order, either increasing or decreasing.

FIG. 1 schematically illustrates a rear wheel drive powertrain. Power is provided by internal combustion engine 10. Transmission 12 adapts the speed and torque produced by engine 10 to suit current vehicle conditions and delivers the power to driveshaft 14. Specifically, at low vehicle speeds and/or high power demands, transmission 12 permits the engine to run at a faster speed than driveshaft 14 and multiplies the torque generated by the engine. At high vehicle speeds and low power demands, transmission 12 establishes an overdrive speed ratio such that driveshaft 14 rotates faster than engine 10. Differential 16 transmits power from driveshaft 14 to left and right half-shafts 18 and 20.

Left and right half shafts 18 and 20 transmit the power to left and right rear wheels 22 and 24 respectively. Differential 16 reduces the speed by a fixed final drive ratio and accommodates slight sped differences between the rear wheels 22 and 24. In a rear wheel drive powertrain, front wheels 26 and 28 are not powered. In a four wheel drive powertrain, a transfer case, front driveshaft, front differential, and front half-shafts divert power from the rear wheels to the front wheels.

Engine 10 and transmission 12 responds to control signals from controller 30. Controller may be a single microprocessor or multiple communicating microprocessors. Controller 30 determines driver intent based on signals from shift selector 32, accelerator pedal 34, and brake pedal 36. Controller 30 utilizes other sensors, not shown, to determine the vehicle state such as component speeds, fluid temperatures, etc.

Figure 2:
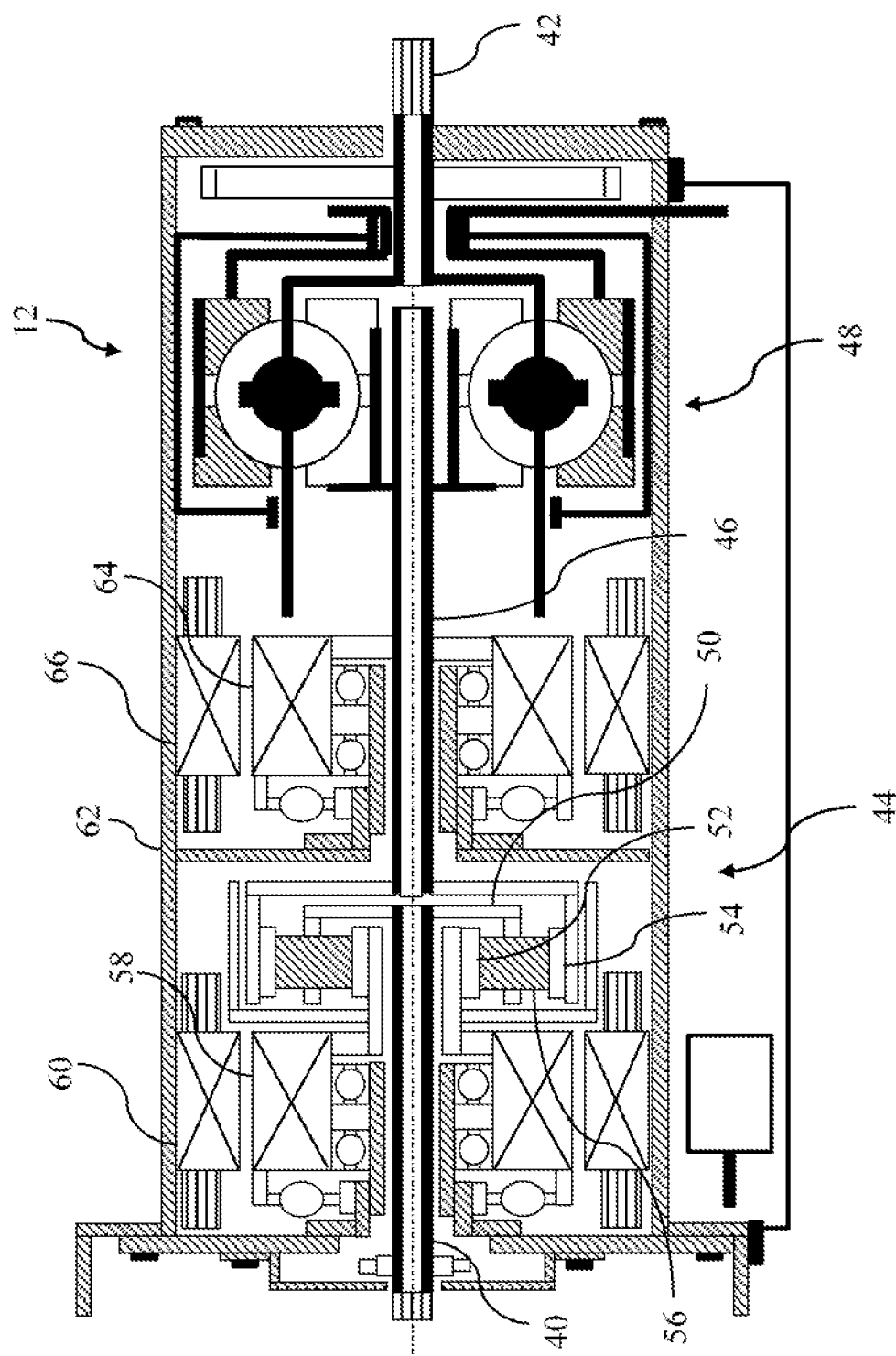
FIG. 2 is a cross section of a first embodiment of a transmission suitable for use in the vehicle powertrain of FIG. 1.

FIG. 2 is a cross sectional view of a first embodiment of transmission 12. Input shaft 40 is adapted to be coupled to the crankshaft of engine 10. Output shaft 42 is adapted to be coupled to driveshaft 14. Powersplit hybrid section 44 transmits power from input shaft 40 to intermediate shaft 46. Variator 48 transmits power between intermediate shaft 46 and output shaft 42.

Powersplit hybrid section 44 includes a planetary gearset having carrier 50, sun gear 52, and ring gear 54. A set of planet gears 56 are supported for rotation relative to carrier 50 with each planet gear meshing with both sun gear 52 and ring gear 54. Carrier 50 is fixedly coupled to input shaft 40. Sun gear 52 is fixedly coupled to rotor 58 of a first electric machine. The stator 60 of the first electric machine is fixed to transmission case 62. Ring gear 54 is fixedly coupled to intermediate shaft 46 and also to rotor 64 of a second electric machine. The stator 66 of the second electric machine is fixed to transmission case 62. Planetary gearset establishes a fixed linear speed relationship among the rotor 58 of the first electric machine, the input shaft 40, and the intermediate shaft 46. The first electric machine may be called the generator and the second electric machine may be called the traction motor, although both are reversible electric machines capable of alternately converting electric power to mechanical power and converting mechanical power to electric power. For example, first and second electric machines may be permanent magnet synchronous motors.

Figure 3:
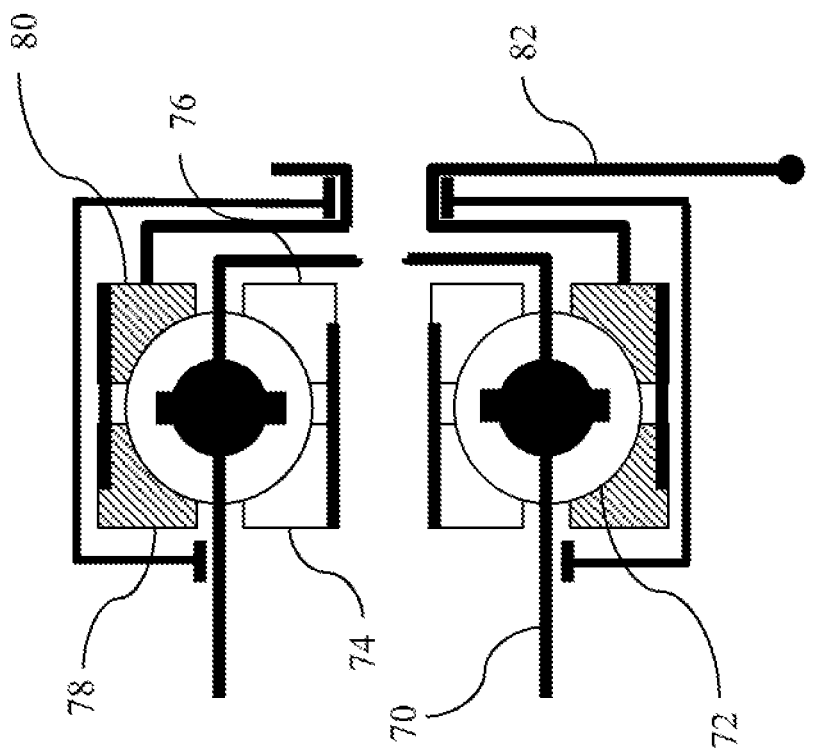
FIG. 3 is a cross section of a variator suitable for use in the transmission of FIG. 2.

FIG. 3 is a cross section of variator 48. A variator is a mechanical device that transmits mechanical power at any speed ratio within a predefined range of speed ratios. Variators are configured to continuously adjust the speed ratio and the torque ratio meaning that these ratios may be changed gradually and in unison as opposed to being changed in steps via shift events. As the speed ratio and torque ratio change, the product is substantially constant, subject to slight variability of parasitic losses as a function of speed ratios.

Variator 48 is a type of epicyclic ball variator known as a Milner variator. Although other types of variator may be suitable for this application, the Milner type is particularly suited because the output is on the same axis as the input and the variator produces an underdrive speed ratio. Carrier 70 supports a set of planet balls 72. Each ball contacts front and rear sun rollers 74 and 76 and also contacts front and rear ring rollers 78 and 80. Axial forces between sun rollers 74 and 76 and also between ring rollers 78 and 80 apply normal force such that torque may be transferred via frictional contact. Ratio adjustment arm 82 adjust the relative axial position of ring rollers 78 and 80 to vary the contact point and therefore the effective radius of the planet ball 72. As applied in transmission 12, sun rollers 74 and 76 are the variator input, carrier 70 is the variator output, and ring rollers 78 and 80 are held stationary relative to transmission case 62. (There may be some relative rotation between sun rollers 74 and 76 and between ring rollers 78 and 80 during ratio change.) In this configuration, the speed ratio can take on any value between about 1.5 and about 6.0. The structure and operation of Milner variators are described in more detail in U.S. Pat. Nos. 6,461,268; 7,125,359; 7,608,006; and 8,740,743.

The overall speed ratio of transmission 12 is equal to the product of the speed ratio of powersplit section 44 and the speed ratio of variator 48. Controller 30 adjust the speed ratio of both powersplit section 44 and variator 48 to achieve the overall speed ratio in the most efficient manner. During positive power operation (as opposed to coasting or braking), the transmission may be operated to utilize electrical energy only, a combination of electrical energy and engine power, engine power only, or an excess of engine power such that electrical energy is stored for later. Controller 30 determines which of these modes to utilize at a given point in time based on driver power demand, vehicle speed, and battery state of charge.

When operating with electric energy only, the engine may be stopped and the second electric machine provides all power. The speed ratio of variator 48 is set primarily based on the characteristics of the second motor. At low rotor speeds, the electric machine may be limited to a maximum torque rating. In this low speed regime, the electric machine power is proportional to the rotor speed. At higher rotor speeds, the electric machine may be limited to a maximum power rating. The electric machine may also have a maximum speed rating. The At low vehicle speed, a more underdrive variator speed ratio permits the second electric machine to operate in the power limited regime at a high efficiency operating point. In fact, this capability permits use an electric machine with a lower torque rating than would otherwise be needed for the application. At higher vehicle speeds, a less underdrive variator speed ratio limits the speeds of both electric machines.

When operating with engine power, the efficiency of the powersplit section is optimized by operating at a speed ratio such that the sun gear is near stationary. At this powersplit speed ratio, very little power is transmitted via the electrical path from one electric machine to the other electric machine. Therefore, the variator speed ratio is set such that the powersplit section can be operated near this point, subject to component speed constraints.

During negative power (braking) operation, the controller operates transmission 12 to optimize the fraction of the power that can be captured as electric energy. At higher vehicle speeds, modest braking may exceed the maximum power rating of the second electric machine and/or the battery. At such times, the variator speed ratio is set to ensure that both motors remain within their respective speed limits. Any braking demand that exceeds this limit is handled by the vehicle friction brakes. As vehicle speed decreases, the variator ratio is adjusted to a more underdrive ratio to keep the rotor of the second electric machine within the power limited regime. Thus, the ability to capture braking energy is increased relative to a pure powersplit transmission. Since variator 48 changes ratio without interrupting the flow of power, there is no loss of potential energy capture during the ratio change. Also, since the ratio changes smoothly as opposed to changing in discrete steps, there is no need to limit energy capture in order to limit occupant dissatisfaction with shift feel.

Figure 4:
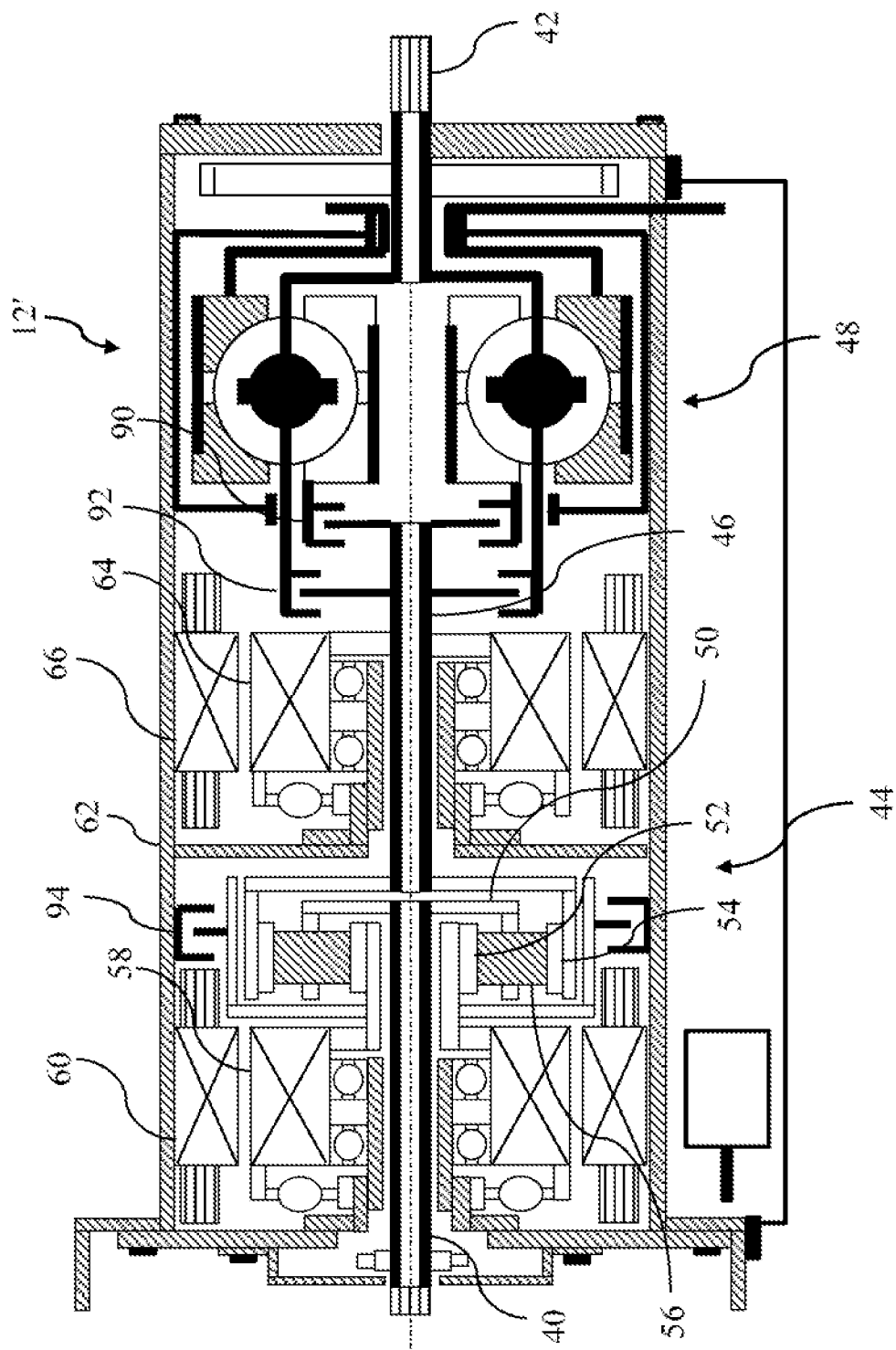
FIG. 4 is a cross section of a second embodiment of a transmission suitable for use in the vehicle powertrain of FIG. 1.

FIG. 4 is a cross sectional view of a second embodiment of transmission 12. In this embodiment, intermediate shaft 46 is selectively coupled to the variator input by clutch 90 and selectively coupled to the variator output by clutch 92. Brake 94 selectively holds sun gear 52 against rotation. By strategic engagement of these shift elements, the second embodiment is able to operate in a more efficient manner than the first embodiment in some conditions.

During low speed operation, or when frequent vehicle speed changes are likely, clutch 90 is engaged and clutch 92 is disengaged. In this mode, the transmission may be operated in the same manner as the first embodiment as described above. As mentioned above, when engine power is used, it is advantageous to set the variator ratio such that the speed of sun gear 52 is near zero. In such circumstances, the powersplit portion can be made even more efficient by engaging brake 94 to hold sun gear 52 stationary. This saves the electrical energy that would otherwise have been required when using the first electric machine to hold sun gear 52 stationary.

During highway cruising, clutch 92 is engaged and clutch 90 is disengaged. In this operating mode, variator 48 is bypassed, eliminating most of its parasitic losses. All speed ratio adjustment is handled by powersplit section 44. If braking occurs while the transmission is in this mode, controller may release clutch 92 and engage clutch 90 to transition into the other operating mode. It may be necessary to limit the regenerative braking during this shift to avoid occupant discomfort. However, aggressive braking is uncommon during highway driving.

The second embodiment may omit brake 94. Similarly, the additional capability associated with brake 94 may be added to the first embodiment without adding clutches 90 and 92.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A hybrid transmission comprising:
a planetary gearset having a first planetary element fixedly coupled to an input shaft, a second planetary element fixedly coupled to a first electric machine, and a third planetary element fixedly coupled to a second electric machine and to an intermediate shaft; and
a variator configured to continuously adjust a speed ratio and a torque ratio between the intermediate shaft and an output shaft.

2. The hybrid transmission of claim 1 wherein the first planetary element is a carrier, the second planetary element is a sun gear, and the third planetary element is a ring gear.

3. The hybrid transmission of claim 1 wherein the variator comprises an epicyclic ball variator having an input element coupled to the intermediate shaft and an output element fixedly coupled to the output shaft.

4. The hybrid transmission of claim 3 wherein the epicyclic ball variator is a Milner variator.

5. The hybrid transmission of claim 3 wherein the input element is fixedly coupled to the intermediate shaft.

6. The hybrid transmission of claim 3 wherein the variator further comprises a first clutch configured to selectively couple the intermediate shaft to the input element.

7. The hybrid transmission of claim 6 further comprising a second clutch configured to selectively couple the intermediate shaft to the output shaft.

8. The hybrid transmission of claim 7 further comprising a brake configured to selectively hold the second planetary element against rotation.

9. A hybrid transmission comprising:
a planetary gearset having a carrier fixedly coupled to an input shaft, a sun gear fixedly coupled to a first electric machine, and a ring gear fixedly coupled to a second electric machine and to an intermediate shaft; and
a variator configured to continuously adjust a speed ratio and a torque ratio between the intermediate shaft and an output shaft.

10. The hybrid transmission of claim 9 wherein the variator comprises an epicyclic ball variator having an input element coupled to the intermediate shaft and an output element fixedly coupled to the output shaft.

11. The hybrid transmission of claim 10 wherein the epicyclic ball variator is a Milner variator.

12. The hybrid transmission of claim 10 wherein the input element is fixedly coupled to the intermediate shaft.

13. The hybrid transmission of claim 10 wherein the variator further comprises a first clutch configured to selectively couple the intermediate shaft to the input element.

14. The hybrid transmission of claim 13 further comprising a second clutch configured to selectively couple the intermediate shaft to the output shaft.

15. The hybrid transmission of claim 14 further comprising a brake configured to selectively hold the second planetary element against rotation.

16. A hybrid transmission comprising:
a planetary gearset having a first planetary element fixedly coupled to an input shaft, a second planetary element fixedly coupled to a first electric machine, and a third planetary element fixedly coupled to a second electric machine and to an intermediate shaft;
a variator configured to continuously adjust a speed ratio and a torque ratio between a variator input and an output shaft;
a first clutch configured to selectively couple the intermediate shaft to the variator input; and
a second clutch configured to selectively couple the intermediate shaft to the output shaft.

17. The hybrid transmission of claim 16 wherein the first planetary element is a carrier, the second planetary element is a sun gear, and the third planetary element is a ring gear.

18. The hybrid transmission of claim 16 wherein the variator is a Milner variator.

19. The hybrid transmission of claim 16 further comprising a brake configured to selectively hold the second planetary element against rotation.

* * * * *